United States Patent [19]
Cox et al.

[11] Patent Number: 5,575,878
[45] Date of Patent: Nov. 19, 1996

[54] METHOD FOR MAKING SURFACE RELIEF PROFILERS

[75] Inventors: J. Allen Cox, New Brighton; Robert M. Wilke, Maple Grove, both of Minn.

[73] Assignee: Honeywell Inc., Minneapolis, Minn.

[21] Appl. No.: 347,544

[22] Filed: Nov. 30, 1994

[51] Int. Cl.$^6$ .................................................. B32B 31/00
[52] U.S. Cl. ...................... 156/247; 156/220; 156/275.5
[58] Field of Search ................................. 156/220, 275.5, 156/272.2, 235, 238, 247, 273.7, 289, 630, 643

[56] References Cited

U.S. PATENT DOCUMENTS

| | | |
|---|---|---|
| 4,491,486 | 1/1985 | Iwai . |
| 4,512,848 | 4/1985 | Deckman et al. . |
| 5,279,689 | 1/1994 | Shvartsman . |

FOREIGN PATENT DOCUMENTS

4413575A1   10/1994   Germany .

OTHER PUBLICATIONS

H. Andersson et al., "Single photomask, multilevel in quartz and photoresist: manufacture and evaluation," Oct. 1, 1990, *Applied Optics*, vol. 29, No. 28, pp. 4259–4267.

Primary Examiner—James Engel
Attorney, Agent, or Firm—John G. Shudy, Jr.

[57] ABSTRACT

A method of multiple replication of a diffractive optical glass surface relief profiles into other glass-type substrates. For example, a malleable but hardenable layer formed on a glass substrate is embossed with a stamper having a reverse image of the optical glass surface relief profile, to result in a high quality copy of the original diffractive glass surface relief profile. The embossed layer is hardened and separated from the stamper. The hardened layer having the embossed surface relief profile is, for instance, etched down such that the surface relief profile is etched in to the surface of the glass substrate. The result of this method is a readily producible and very durable glass or like-material accurate replica, having high fidelity and being capable of providing high quality images, of another diffractive optical element.

10 Claims, 2 Drawing Sheets

METHOD FOR MAKING SURFACE RELIEF PROFILERS

BACKGROUND OF THE INVENTION

This invention pertains to replication of diffractive optical elements embodied as surface relief structures and profiles and particularly to replication of higher quality and more durable optical elements than those in the related art.

Others have used a dry photopolymer embossing (DPE) method to produce high fidelity and high image-quality replicas of diffractive optical elements on "plastic" and "glass" substrates. A film is formed on the substrate and is embossed with a stamper to provide an embossed film that is a replica of the original diffractive element. Since the embossed film is made from a polymeric or like embossable material, the embossed film does not have good durability under affecting environmental conditions such as temperature, humidity, ultraviolet light, aerosols, physical handling, wear, and so forth. The embossed film on the substrate may lose its adhesion to the substrate or the lose fidelity of its profile.

Diffractive optical elements, sometimes referred to as surface relief holograms, kinoforms, binary optics, or phase gratings, are used to replace or enhance conventional optical components in a variety of applications, such as head-mounted displays, projection displays, photocopiers, optoelectronic modules for data communications, optical storage devices, electronic imaging sensors and systems, laser systems, and ophthalmic products for the vision impaired. Generally, the optical functions implemented in diffractive elements can be classified as either imaging or nonimaging. Examples of imaging functions are focusing power, aspheric aberration correction, chromatic aberration correction, distortion correction, and athermalization. Examples of nonimaging functions are spectral filters, condensing microlenses, spot array generators (Damann gratings), diffusing screens, and zero-order grating structures used for antireflective devices, phase retardation devices, or polarizing devices. For many applications involving diffractive optics as either imaging or nonimaging elements, the optical performance must not degrade in the presence of commonly encountered environmental conditions such as humidity and temperature variations and exposure to ultraviolet radiation or aerosols. Further, when used to implement imaging functions, the diffractive elements must maintain high image quality in the optical wavefronts transformed by the diffractive surface.

Replication of diffractive optics is widely recognized as necessary to achieve affordable mass producibility. A film of photopolymer is formed on the substrate and is embossed with a stamper to provide an embossed film that is a replica of the original diffractive element. A related art dry photopolymer embossing procedure for replication of diffractive optic elements is related by E. I. Du Pont de Nemours and Company (Du Pont) of Wilmington, Delaware. Such procedure and certain substances used in such related art replication is disclosed in a U.S. Pat. No. 5,279,689, by Felix P. Shvartsman, issued Jan. 18, 1994, and entitled "Method for Replicating Holographic Optical Elements," (hereafter Shvartsman) which is hereby incorporated by reference in the present description. Shvartsman discloses both a dry photopolymer embossing procedure and a photopolymeric material (trade name SURPHEX) capable of replicating with high fidelity diffractive elements having high aspect ratio. SURPHEX is capable of replication of very high aspect ratio features (in the range of 20:1) with very high fidelity (with shrinkage less than 0.1 percent) while maintaining a high optical finish and wavefront quality (of about λ/10). Shvartsman further discloses that the substrate may be either polycarbonate, polymethylmethacrylate (PMMA), or glass. However, subsequent research has demonstrated that the photopolymeric composition disclosed adheres only to the plastic substrate materials (polycarbonate and PMMA) and does not adhere to glass.

J. A. Cox and F. P. Shvartsman, "Image Quality Assessment of Diffractive Optical Elements Replicated in Surphex," in *Diffractive Optics*, Vol. 11, 1994, OSA Technical Digest Series (Optical Society of America, Washington, DC, 1994), pp. 346–9 (hereafter Cox and Shvartsman), provide experimental data to demonstrate that ideal, diffraction-limited imagery is feasible on PMMA substrates using the dry photopolymer embossing procedure and SURPHEX photopolymer disclosed by Shvartsman. Cox and Shvartsman further demonstrate that observed aberrations degrading image quality in the replicas are caused by surface irregularity in the plastic substrate itself and are not caused by any imperfection in the photopolymer film or the embossing procedure.

It should be noted that in order to achieve both high fidelity and high image quality in the replicated diffractive element, the photopolymer film must possess special characteristics with respect to shrinkage and uniformity of refractive index. First, there is some shrinkage in the embossed film after curing. Shrinkage changes the dimensions of the surface profile embodying the diffractive element, often in an unpredictable manner, and causes degradation in the diffraction efficiency of the replica, leading to the undesirable diversion of light into higher diffractive orders. Shrinkage can also cause warpage in the substrate carrying the embossed photopolymer film, and the warpage introduces undesired optical aberrations, such as astigmatism and coma, in the image quality. Experience has shown that acceptable optical performance is achieved when shrinkage is less than one percent. F. P. Shvartsman, "Replication of Diffractive Optics," in *Critical Reviews on Diffractive and Miniaturized Optics*, Vol. CR49 (SPIE Press, Bellingham 1994), pp. 165–86 (hereafter Shvartsman's article), has shown that shrinkage in SURPHEX, the photopolymer disclosed in Shvartsman, is less than one-tenth of a percent. Secondly, in order to achieve high image quality, the cured photopolymer film must exhibit good spatial uniformity in its index of refraction. Variations in the refractive index can cause serious degradation in image quality, as noted by Cox and Shvartsman. Although it has not been possible to establish precise bounds on acceptable variation in the refractive index, the data of Cox and Shvartsman demonstrate that the photopolymer disclosed by Shvartsman does meet the requirement while other materials, such as ultraviolet-curable optical epoxies, do not.

In experiments conducted by J. A. Cox, unpublished test results recorded in *Honeywell Data Book*, "Diffractive Optics No. 8", pp. 22–50, 18 Oct. 1994—11 Nov. 1994 (hereafter Cox) relating to humidity and temperature susceptibility tests performed on diffractive optical elements replicated in SURPHEX on PMMA substrates (2 each) and fused quartz substrates (2 each) in accordance with MIL-STD-810B, Method 507, Procedure I, using both the dry photopolymer embossing procedure and the photopolymer disclosed by Shvartsman, Cox duplicated the results reported in Shvartsman's article, for plastic (i.e., PMMA) substrates. Cox also demonstrated that the same photopolymer does not adhere to glass (fused quartz) substrates.

Finally, Cox subjected replicas of a diffractive optical element described by Cox and Shvartsman to a standard humidity and temperature environmental test prescribed for optics (MIL-STD 810B, Method 507, Procedure I), and Cox observed degradation in both the physical and optical properties of the replicas. The most serious degradation in physical properties observed were etching in the surface of the photopolymer film and changes in the dimensions of the surface profiles features. The most serious degradation in optical properties observed were increased scatter and a decrease in diffraction efficiency.

Thus, the prior art disclosed by Shvartsman provides a means of replicating diffractive elements with high fidelity and high image quality on plastic substrates, wherein the image quality is limited by the surface quality of the plastic substrate and the photopolymer film is not durable under common environmental conditions.

SUMMARY OF THE INVENTION

The present invention is an extension and an improvement of the related technique of replicating diffractive optical elements. A technique is described which enables the photopolymer disclosed by Shvartsman, and other similar photopolymeric materials, to adhere to non-plastic substrates, such as glass, Si, GaAs, or like material. The replica in this invention has the diffractive optical profile in the substrate itself which is of glass or like material, rather than in a film of a polymeric material formed on the substrate. The surface relief profile of the original is transferred to the glass substrate with high fidelity, one percent or less, and excellent image quality with a method that is fast and inexpensive, thereby permitting high volume and low cost producibility of the diffractive optical elements and other micromachined surface relief structures with similar dimensions reproduced in a durable substance.

DESCRIPTION OF THE EMBODIMENT

Figure 1:
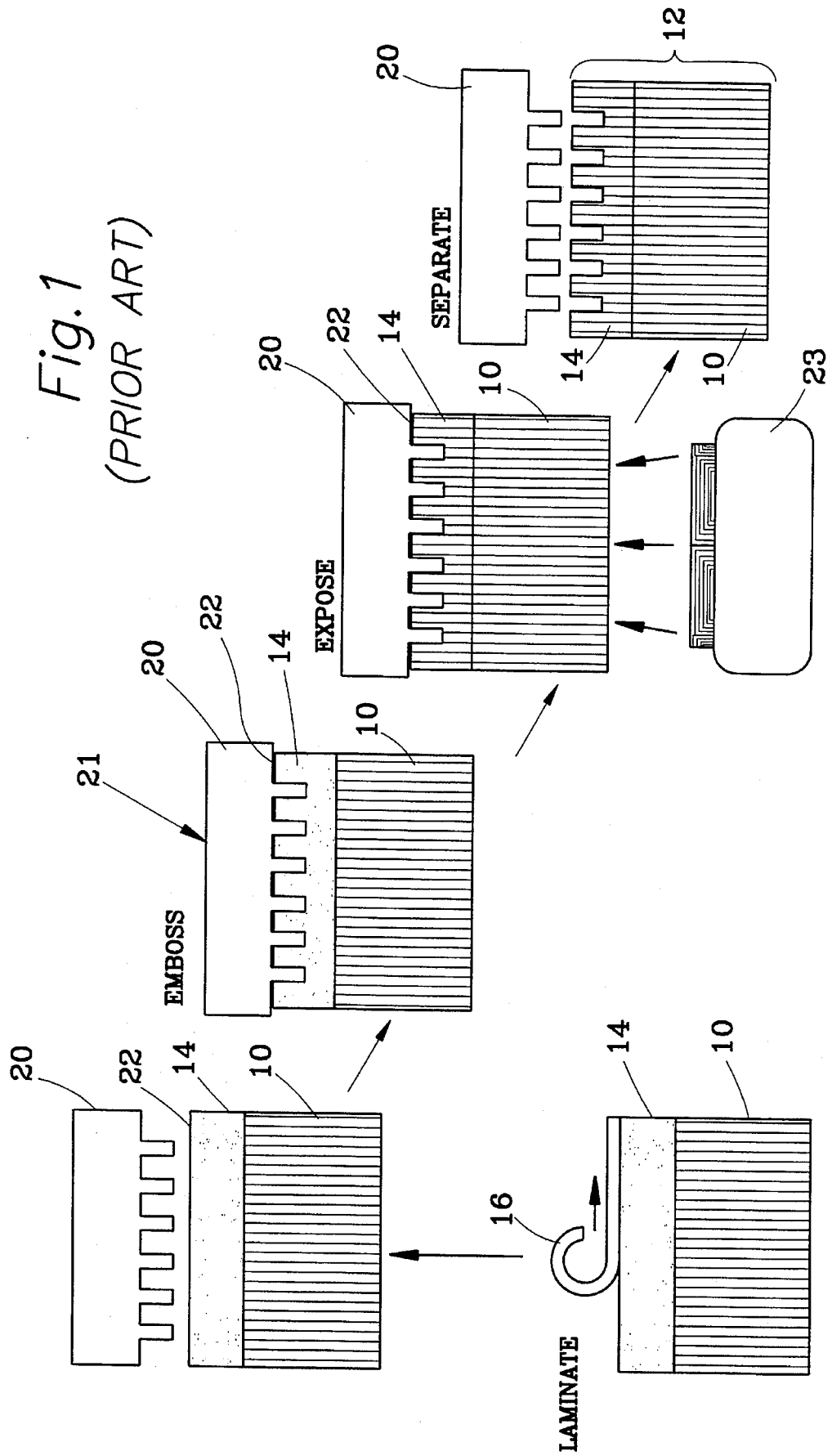
FIG. 1 shows a related art method for reproducing surface relief profiles.

A related art dry photopolymer embossing procedure for replication of diffractive optic elements is shown in FIG. 1, as disclosed by Shvartsman. First, an embossable material 14, with a temporary support film 16, is formed or laminated on a blank plastic or glass substrate 10 using heat and/or pressure. The temporary support film or cover sheet 16 is then removed. The thickness of layer 14 is between 2 and 50 microns. "Plastic" substrate 10 may be formulated from a variety of polymeric materials meeting suitable optical criteria. "Glass" substrate 10 may be formulated from $SiO_2$, fused quartz or other glass, Si, GaAs or other like inorganic substances. Layer 14 is a photohardenable layer, which may be an optical cement or a curable epoxy for small areas. SURPHEX-P is a material by and available from Du Pont which may be used for layer 14 which is formed on a "plastic" substrate 10, and SURPHEX-G, also by and available from Du Pont, may be used on a "glass" substrate 10.

A stamper 20 is positioned on laminated element 14 and pressed into the surface of photohardenable layer 14 by applying a pressure 21 between 2.8 and 11 Mpa (400–1600 psi). Before stamper 20 is removed from embossed surface 22, layer 14 is exposed to actinic radiation from source 23, which passes through substrate 10 to expose and cure layer 14. Such radiation may be ultraviolet light of a 320 to 395 nanometer wavelength and have a power of 500–2500 $mJ/cm^2$. The primary requirement of the radiation is the capability to initiate hardening in layer 14 and to have the lack of interference with the optical characteristics of layer 14. After photohardening or curing embossed layer 14, stamper 20 is removed from embossed surface 22 of layer 14 to result in a replicated optical element 12. The aspect ratio of grooves 24 is at least 3:1, that is, the height is at least three times greater than the width of each groove 24. Aspect ratios of 10:1 or larger are attainable. A significant problem with resulting optical element 12 is the lack of environmental durability. Element 12 is very susceptible to physical wear and abuse. Layer 14 tends to have at least a slightly varying index of refraction, which is also a problem if layer 14 is thick and constitutes substrate 10. Also, the lamination of layer 14 on substrate 10, provided that layer 14 is not also substrate 10, is subject to shifting on and peeling from substrate 10. In either case, layer 14 is subject to degradation, especially over time. Even if substrate 10 is glass, layer 14 is always subject to shifting, peeling and degradation, and the resultant layer 14 and substrate 10 combination is not durable.

Figure 2:
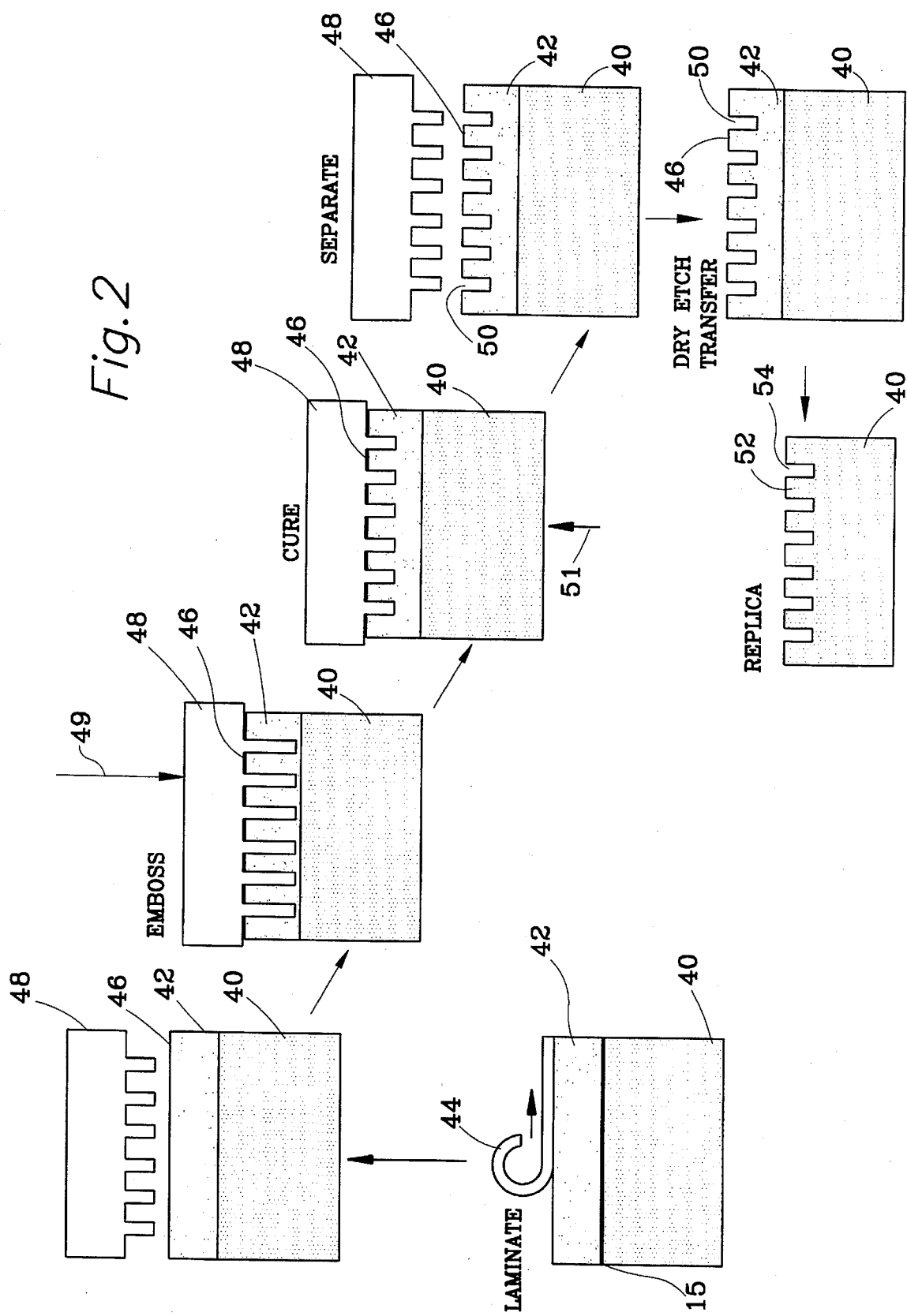
FIG. 2 shows the present method for reproducing surface relief profiles.

FIG. 2 shows an improved process for replicating a total glass diffractive optical element having high fidelity of less than one percent infidelity from the master optical element, high image quality only limited by diffraction resolution, a constant index of refraction, high throughput, low cost productivity and very high durability. However, optical quality of the material of layer 42 is not relevant as the profile of layer 42 is completely transferred into glass substrate 40. Surface relief profiles having submicron features and high aspect ratios can be replicated in glass or glass-like materials.

First, if the substrate is a material other than polycarbonate or PMMA (e.g., such as glass), then a thin primer layer 15 of PMMA (like a "glue" or adhesion film) is applied to the substrate to enable adhesion of the subsequently applied photopolymer film. Although certain transfer materials used in layer 42 may not require an adhesion film 15. The present embodiment incorporates a film 15 of an approximately 2500 Angstrom thickness of PMMA electron-beam photoresist applied in accordance with well known techniques used in the semiconductor industry. The PMMA film is then baked to cure and harden film 15 on substrate 40.

An embossable material 42, having a temporary support film 44, is formed or laminated on a blank glass substrate 40 using heat and/or pressure. The temporary support film or cover sheet 44 is then removed. The thickness of layer 42 is minimized in order to achieve good transfer fidelity. A recommended thickness of layer 42 is two microns or less. "Glass" substrate 40 may be formulated from $SiO_2$ or other kinds of glass, Si, GaAs or other similar inorganic material. Layer 42 is photohardenable and may be composed of an optical cement, curable epoxy or other material. A specific material for layer 42 may be a SURPHEX-P substrate by Du Pont. The replica in the SURPHEX film or substrate is treated only as an intermediate carrier needed to transfer the profile into the desired substrate material, resulting in being referred to as "replicative transfer micromachining."

An embossing die or stamper 48 is formed, cut or machined, and is a negative or reverse surface profile of the master diffractive optical element to be replicated. Die or stamper 48 is positioned on laminated element 42 and pressed into surface 46 of a malleable, photohardenable or curable layer 42 by applying a pressure 49 which may be between 1 and 20 Mpa (≈140–3000 psi). Before die or stamper 48 is removed from embossed surface 46, layer 42 is cured by, for example, exposure to actinic radiation 51 which passes through substrate 40 to expose and cure layer 42. Such radiation may be ultraviolet light of a 320 to 395 nanometer wavelength and have a power of 500–2500 mJ/cm$^2$. A primary requirement of radiation 51 is the capability of initiating hardening in layer 42. After photohardening or curing embossed layer 42, die or stamper 48 is removed from embossed surface 46 of layer 42 to result in a replicated element in layer 42. The aspect ratio (depth:width) of grooves 50 is at least 1:80, that is, the width is at least one eighty the height of grooves 50. Aspect ratios from 0.01:1 to 10:1 or larger may be attained and utilized.

The high fidelity replication of grooves 50 formed in layer 42 is dry etch transferred to glass substrate 40, using an anisotropic etch technique, such as ion milling, reactive ion etching (RIE) or chemically assisted ion beam etching (CAIBE), for a high quality transfer from layer 42 to layer 40. The result is a durable "glass" replica having a surface 52 and grooves 54 which are within one percent of the dimensions of surface 46 and grooves 50. It is not necessary that the etch rate in SURPHEX, or other transfer material of layer 42, be the same as that in glass substrate 40. It is only necessary that the two rates be known, stable and repeatable. The difference in etch rates can be compensated for in the fabrication of the master element.

I claim:

1. A method for making diffractive optical glass replicas, comprising:

applying a thin adhesion film of PMMA to a surface of a dimensionally stable, optically transparent glass substrate;

laminating a dry photohardenable film to the thin adhesion film, the dry photohardenable film capable of being embossed to form a surface relief profile having submicron features;

embossing a surface relief profile in the photohardenable film by applying a stamper containing a reversal of a surface relief profile of a master diffractive optical glass to be replicated, to the photohardenable film;

effecting the hardening of the photohardenable film while maintaining an embedded contact between the stamper and the photohardenable film, resulting in a photohardened film containing the surface relief profile;

separating the stamper from the photohardened film containing the surface relief profile; and performing a surface relief profile transfer by applying a removal solution on the photohardened film such that all portions of the surface relief profile are removed at the same rate through the film and into the glass substrate, the rate of removal on all portions of the surface relief profile is at a known rate into the glass substrate, the removal ceasing after all of the photohardened film on the glass substrate is removed, resulting in a glass substrate containing the surface relief profile.

2. The method of claim 1 wherein the glass substrate is made from a material selected from a group consisting of SiO$_2$, quartz, Si and GaAs.

3. The method of claim 1 wherein said stamper is made by the steps of:

applying a second dry photohardenable film to a surface of a second dimensionally stable substrate;

embossing an exposed surface of the second photohardenable film with the surface relief profile of the master diffractive optical glass to be replicated;

effecting the hardening of the second photohardenable film while in contact with the surface relief profile of the master diffractive optical glass; and separating the second photohardened film from the surface relief profile of the master diffractive optical glass, resulting in the stamper comprising the second photohardened film, having the reverse surface relief profile, formed on the second dimensionally stable substrate.

4. The method of claim 3 wherein a release layer is applied to the second photohardened film after the separating the second photohardened film from the surface relief profile of the master diffractive optical glass.

5. The method of claim 4 wherein the release layer is of a group consisting of Al and Cr.

6. The method of claim 4 wherein the release layer is a low surface energy solid organic polymer.

7. The method of claim 6 wherein the low surface energy solid organic polymer is a fluoropolymer.

8. The method of claim 1 wherein the effecting the hardening of the photohardenable film comprises the passing of actinic radiation through the optically transparent substrate and the photohardenable film while maintaining embedded contact between the stamper and the photohardenable film.

9. A method for making optical glass replicas from a optical glass master having a first surface profile, comprising:

forming a layer, having first and second surfaces, of photohardenable material on a glass substrate having a first surface, the first surface of the layer in contact with and adhered to the first surface of the glass substrate;

forming a stamper having a second surface profile on a first surface, the second surface profile being a reverse profile of the first surface profile of the optical glass master;

bringing the first surface of the stamper into contact with the second surface of the layer of hardenable material, in a manner that the second surface of the layer of the hardenable material is embossed with a third surface profile that is the same as the first surface profile of the optical glass master;

curing the layer of hardenable material such that the hardenable material becomes hardened and undistortable;

removing the first surface of the stamper away from the second surface of the layer of hardened material, the second surface of the layer of hardened material having the third surface profile; and transferring the third surface profile from the second surface of the layer of hardened material to the first surface of the glass substrate by removing a first thickness of material from the layer of hardened material, beginning at the second surface of the layer of hardened material and ending into the first surface of the glass substrate so as to result in the first surface of the glass having a fourth surface profile that is same of the first surface profile of the optical glass master; and wherein the first surface of the layer of photohardenable material is caused to be adhered to the first surface of the glass substrate with a very thin adhesion film of PMMA situated between the first surfaces of the layer of photohardenable film and the glass substrate.

10. A method for making diffractive optical glass replicas, comprising:

forming a PMMA film on a surface of a dimensionally stable, optical substrate;

laminating a dry photohardenable film to the thin adhesion film, the photohardenable film capable of being embossed to form a surface relief profile having submicron features;

embossing a surface relief profile in the photohardenable film by applying a stamper containing a reversal of a surface relief profile of a master diffractive optical glass to be replicated, to the photohardenable film;

effecting the hardening of the photohardenable film while maintaining an embedded contact between the stamper and the photohardenable film, resulting in a photohardened film containing the surface relief profile;

separating the stamper from the photohardened film containing the surface relief profile; and performing a surface relief profile transfer by applying a removal solution on the photohardened film such that all portions of the surface relief profile are removed at the same rate through the film and into the glass substrate, the rate of removal on all portions of the surface relief profile is at a known rate into the glass substrate, the removal ceasing after all of the photohardened film on the glass substrate is removed, resulting in a glass substrate containing the surface relief profile.

* * * * *